United States Patent [19]
Beckenhauer

[11] Patent Number: 6,110,270
[45] Date of Patent: *Aug. 29, 2000

[54] METHOD FOR INFLUENCING MOISTURE CONTENT AND MIGRATION IN BUILDING MATERIALS

[76] Inventor: Thomas Beckenhauer, 2325 SW. 338$^{th}$ St., Federal Way, Wash. 98023

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/841,531

[22] Filed: Apr. 22, 1997

Related U.S. Application Data

[63] Continuation-in-part of application No. 08/633,696, Apr. 18, 1996, Pat. No. 5,681,385.

[51] Int. Cl.$^7$ .............................. C04B 24/02; C04B 41/46
[52] U.S. Cl. ......................... 106/724; 106/802; 106/823; 106/287.26; 106/2; 427/384; 427/393.6; 427/421; 524/4; 524/650; 428/688
[58] Field of Search ..................................... 106/724, 802, 106/823, 287.26, 2; 427/384, 421, 393.6, 429; 524/4, 650, 557, 5; 428/688, 341

[56] References Cited

U.S. PATENT DOCUMENTS

| | | | |
|---|---|---|---|
| 2,576,955 | 12/1951 | Ludwig | 260/29.6 |
| 3,645,763 | 2/1972 | Ronzio et al. | 106/90 |
| 4,119,597 | 10/1978 | Enoue | 260/23 R |
| 4,363,836 | 12/1982 | Sakato et al. | 427/393.6 |
| 4,434,193 | 2/1984 | Beckenhauer | 427/299 |
| 4,567,221 | 1/1986 | Maruyama et al. | 524/436 |
| 5,631,042 | 5/1997 | Becker et al. | 427/393.6 |
| 5,681,385 | 10/1997 | Beckenhauer | 106/724 |

OTHER PUBLICATIONS

Declaration of Thomas Beckenhauer, pp. 1–3, Exhibits A, B, C, D and E, Oct. 7, 1999.

*Water Repellents for Concrete Masonry Walls*, National Concrete Masonry Association, TEK 10B, 1992. (no month).

Product Brochure describing Airvol polyvinylalcohol from Air Products; Air Products and Chemicals, Inc., Allentown, PA, 1993, (no month).

Product Brochure, "Polymer Product for Adhesives," Air Products and Chemicals, Inc., Allentown, PA 1995, (no month).

*Primary Examiner*—Michael Marcheschi
*Attorney, Agent, or Firm*—Seed Intellectual Property Law Group PLLC

[57] ABSTRACT

The moisture content within, and moisture flow in and out of, porous building materials such as masonry, brick, concrete, and mortar, can be affected by coating the building material with polyvinyl alcohol, or by incorporating polyvinyl alcohol into the building material. The resultant control of moisture movement can influence the suction of the building material, leading to improved bonding with adjacent building material, and can also retard efflorescence.

24 Claims, No Drawings

METHOD FOR INFLUENCING MOISTURE CONTENT AND MIGRATION IN BUILDING MATERIALS

CROSS-REFERENCE TO RELATED APPLICATIONS

The present application is a continuation-in-part of U.S. patent application Ser. No. 08/633,696, filed Apr. 18, 1996 now U.S. Pat. No. 5,681,385.

TECHNICAL FIELD

The present invention relates to a method for improving building materials such as portland cement-based building products, masonry, brick, concrete, mortar, and the like, and more particularly, relates to coating or incorporating polyvinyl alcohol onto or into building materials to thereby influence or control the effective moisture content and moisture migration in building materials.

BACKGROUND OF THE INVENTION

Many building materials, and particularly those that are comprised largely of inorganic compounds, such as masonry, cement, brick, concrete, and the like, are naturally porous. Thus, these building materials possess capillary networks that allow water to penetrate and evaporate from the building material, as well as migrate through the building material.

It is common practice to build structures wherein units of building material are placed adjacent to one another, with the expectation that the two units will form a strong bond. Placing bricks into a Portland cement-based bonding agent, such as mortar, is one example. While the strength of such a bond will depend on several factors, one important factor is the relative suction of the two building materials. In essence, "suction" refers to the tendency of a building material to draw moisture from, or release moisture to, a neighboring structure. Suction may also be referred to as the degree of water absorption exhibited by a material.

The use of bricks and mortar to form a wall provides one illustration of the importance of suction. Brick is typically formed in a kiln, and is quite dry upon leaving the kiln. However, upon sitting under ambient conditions, bricks may absorb some moisture from the air, in an amount depending on ambient temperature and humidity. On the other hand, mortar is quite wet in the uncured state which is used to join bricks together. When brick and uncured mortar come into contact, moisture from the mortar will migrate into the adjacent brick. If the brick exhibits high suction, moisture will migrate rapidly and to a large extent from the mortar into the brick. However, mortar has an optimum curing rate and water content in order for the mortar to fully hydrate and form a strong, non-crumbling structure. Rapid and/or large loss of moisture from the mortar can lower the internal strength of the mortar, as well as the strength of the bond that forms between the brick and the mortar.

In theory, compensation for undesirable suction may be achieved by adjusting the water content of building materials. For example, extra water may be added to grouts, mortars, and other cementitious materials to compensate for the amount that will be absorbed by the brick. Another approach that is sometimes taken is to "pre-wet" the brick, that is, dip the brick in water or spray water on the brick, so that it will display reduced suction. However, in practice, it is very difficult to determine how much extra water should be added to grout or brick, and it is typically the case that the desired bond strength is not obtained by these approaches.

The moisture content of building materials, and the degree and rate at which moisture moves through and/or evaporates from building materials, has implications beyond an effect on bond strengths. For example, excess moisture within porous building materials is a serious problem to the industry. Freeze—thaw cycles create alternate expansion and contraction of the porous building materials that can lead to spalling and disintegration. Biological growth of microbes, mosses, lichens and the like also cause damage and are an aesthetic detriment. Porous building materials that are damp have a decreased R - value and thereby cause heat loss in winter and overheating in summer. Movement of moisture through building materials can cause concomitant salt migration to the surface of building material, thus giving rise to efflorescence.

Accordingly, there is a need in the art for a method to treat building materials in order to affect the moisture content of the building material, and to affect the rate and extent to which moisture migrates into, through and out of building material. The present invention solves these long-standing needs, and provides other related advantages, as discussed below.

SUMMARY OF THE INVENTION

The present invention is directed to a method for affecting the movement of moisture through a porous building material. The method comprises the step of applying a coating composition onto a surface of the building material. The coating composition contains polyvinyl alcohol (PVOH) in addition to optional ingredients. The building material may be, for example, brick, cement, concrete, mortar, plaster or stucco. The coating may be applied to either a cured or uncured surface. Preferably, the PVOH has a hydrolysis percent of at least about 70%, and more preferably has a hydrolysis percent of about 87% to about 99.9%. The coating composition is preferably aqueous, and has a PVOH concentration of about 0.01% to about 30% by weight, based on the total weight of the PVOH and water in the composition. The coating composition may be applied to the surface in an amount of about 1 to about 1000 square feet of surface/gallon of composition.

Another aspect of the invention is a method for affecting the movement of moisture through a porous building material, wherein the components of the building material are mixed with a composition containing polyvinyl alcohol (PVOH). Preferably, the PVOH is admixed with the building material at a PVOH concentration of about 0.001% to about 50% by weight based on the total weight of PVOH and building material.

Another aspect of the invention is an article of manufacture which comprises porous building material that has a surface coated with a coating composition comprising polyvinyl alcohol (PVOH).

A further aspect of the invention is an article of manufacture which comprises an admixture of porous building material and polyvinyl alcohol (PVOH).

These and other aspects of the invention will become evident upon reference to the following detailed description.

DETAILED DESCRIPTION OF THE INVENTION

The present invention provides a method of enhancing suction and bonding by using polyvinyl alcohol to attract and temporarily hold moisture onto and into the surfaces of porous building materials. Bonding agents such as Portland cement-based bonding agents are strengthened by a temporary retention of water and thereby achieve a stronger bond. A porous masonry unit treated by the method disclosed in the present invention has an increased attraction for the moisture in Portland cement-based mortar and consequently the porous masonry unit experiences increased suction of the moisture in the mortar. Temporary retention of moisture helps to delay the initial set of Portland cement. This initial moisture that normally flashes off is delayed with a stabilization of moisture loss imparted by the PVOH.

Thus, the invention provides a method for affecting the movement of moisture through a porous building material. The term "affecting the movement of water" as used herein means that one or more of the following effects are achieved: the suction of the porous building material is influenced, typically reduced, so that stronger bonding occurs between the porous building material and an adjacent building material; moisture content within porous building material is reduced so that freeze-thaw cycles cause less spalling and disintegration; moisture content within porous building material is reduced so that the environment within the porous material is less amenable to supporting microbial life; moisture content within a porous building material remains low so that the insulative capacity of the building material remains relatively high; movement of moisture and salts within the moisture is reduced so that effloresence is retarded. An effective amount of a PVOH-containing composition is sufficient to achieve one or more of the above effects when placed in contact with building material.

The present invention provides articles of manufacture useful in building or constructing structures that experience improved suction and bonding, and optimum moisture content, and provides a method of improving a building material that would otherwise be susceptible to uncontrolled degrees of suction, bonding, and moisture loss.

The building material which is suitably employed in the invention is any material that can exhibit, or is subject to uncontrolled degrees of suction, bonding, and moisture loss. Brick, cement, concrete, mortar, plaster and stucco are non-limiting examples of such building materials. Building materials which are mainly inorganic are a suitable class of building materials for use in the invention. Preferred mainly inorganic building materials are formed in whole or in part from portland cement, including normal portland cement, modified portland cement, high-early-strength portland cement, low-heat portland cement, sulfate-resisting portland cement, air-entrained portland cements, portland blast-furnace slag cements, white portland cement, portland-pozzolana cement, redi-mix concrete, precast concrete, architectural concrete, concrete paving, prestressed concrete and masonry based on portland cement.

Another preferred group of building materials subject to uncontrolled degrees of suction, bonding, and moisture loss are common masonry materials such as brick (including adobe, clay, reinforced clay, clay tile and clay pavers), stone (including granite, limestone and river rock), concrete block (including architectural building block, prefaced or glazed block, common building block and concrete products) and mortar (such as lime mortar and lime-and-portland cement mortar).

Cementitious materials such as inorganic hydraulic cement, portland cement, masonry cement, waterproofed cement, pozzolana cement, alumina cement, synthetic calcium aluminate cement, expanded concrete, concrete, concrete block, slump block, concrete pavers, concrete roofing tiles, precast concrete, poured-in-place concrete, tilt-up concrete, ready-mixed concrete, architectural concrete, structural concrete, glass fiber reinforced concrete, exposed aggregate, grout, plaster, stucco, joint cement and natural cement are another category of building material that may be used in the invention.

Plaster and stucco are exemplary building materials of the invention, where Keene's cement, gypsum plaster, cement plaster are representative examples. The building material includes brick and other fired clay-based products such as ceramic, tile and terra-cotta.

The building material of the invention will typically be formed in whole or part of inorganic material, because many inorganic building materials are subject to uncontrolled degrees of suction, bonding, and moisture loss. The building material may be formed from a composite or blend of organic material and inorganic material, or entirely from organic material, as long as the building material is subject to uncontrolled degrees of suction, bonding, and moisture loss. For example, some clays as obtained or mined from the earth contain organic components such as coal, and are suited for treatment according to the invention.

In order to beneficially affect moisture content and movement in porous building material, it has been discovered that the building material should be contacted with polyvinyl alcohol (PVOH). PVOH is available commercially from a number of suppliers, where Air Products (Allentown, Pa.) is a representative supplier of PVOH. PVOH is a white to cream granular powder, having a bulk density of about 40 lbs./cu. Ft. and a Tg (° C.) of about 75–85. PVOH is typically prepared by hydrolyzing polyvinyl acetate, where polyvinyl acetate is typically prepared by homopolymerization of vinyl acetate. PVOH is typically characterized in terms of its hydrolysis percent, where hydrolysis percent reflects the percentage of the acetate groups of the polyvinyl acetate which were hydrolyzed in order to form the PVOH. The PVOH useful in the invention typically has at least 70% hydrolysis, preferably has at least about 87% hydrolysis, and more preferably has about 87%–99.5% hydrolysis, according to values provided by the manufacturer.

The PVOH useful in the invention may also be characterized in terms of its molecular weight. The number average molecular weight of the PVOH useful in the invention is typically at least about 5,000, preferably about 7,000 to about 500,000. The weight average molecular weight of the PVOH is at least about 5,000, and is more preferably about 7,000 to about 190,000.

The PVOH is preferably dissolved in water before being combined with the building material, although it could be dissolved in non-aqueous solvents as well. Techniques to dissolve PVOH in water are known in the art, and are described in the Examples herein. As a general procedure, the PVOH is gradually added to cold or room temperature water, using sufficient agitation to wet out all particles with water and form a dispersion. The surface of the water should be moving vigorously during the PVOH addition. According to a preferred embodiment of the invention, the PVOH will not dissolve in this cold or room temperature water, and the dispersion must be heated to obtain a solution. In one embodiment, the PVOH will dissolve in water at about 1° C. to about 100° C. The heating temperature is generally at least about 50° C., and is preferably in the range of about 80° C.–100° C. (ca. 180° F.–212° F.), and upon being maintained within this temperature range for about 30 minutes, the dispersion of PVOH in water will form an aqueous solution of PVOH. The aqueous solution of PVOH may be cooled back to room temperature, and will remain as a solution.

Alternatively, an aqueous solution of PVOH may be prepared by jet cooking. Aqueous solutions of certain grades of PVOH are cold water soluble and accordingly, aqueous solutions may formulated by introduction of said PVOH into cold water followed by sufficient agitation to dissolve the PVOH. These same cold water soluble grades of PVOH may also be mixed into building materials that will eventually be treated with water such as in the event of masonry mortar. In this event the cold water soluble PVOH may be blended with the dry cement or other dry ingredients of the mortar. When water is introduced for the purpose of hydrating the cement, the cold water PVOH will dissolve upon agitation of the mortar.

The PVOH solution typically contains about 0.001%–50% by weight PVOH, preferably about 0.01%–30% by weight PVOH in an aqueous solution. In general, the upper limit to the PVOH concentration in water is determined only by the viscosity of the resulting aqueous solution. As the content of PVOH increases, the solution becomes more viscous and less easy to handle, and at above about 50% by weight, PVOH solutions are very viscous and difficult to handle.

The precise PVOH content of a PVOH solution useful according to the invention will depend on the exact identity of the PVOH. A lower molecular weight PVOH can generally be formed into a higher solids solution. However, a low solids solution may be readily used in the present invention, although repeated coatings of such a low solids solution onto a surface of a building material may be necessary to achieve the desired effect on moisture.

The desired concentration of PVOH in a solution may be influenced by the surface of the building material that is being coated. For example, where the surface is formed from lightweight concrete block, which is highly absorbent and will require a relatively large amount of PVOH coating to achieve the desired control of suction, bonding, and moisture loss, an approximately 12% PVOH solution is conveniently used. However, where the surface is very dense, the coating may contain only about 2% PVOH. Higher or lower concentrations may be used, depending on the preference of the user.

The PVOH solution may contain ingredients other than PVOH and solvent. For example, where the PVOH solution will be stored for more than a day or two, it is preferred to include a biocide in the solution. One or more of a surface active agent, defoamer and crosslinker may also be added to the solution. Some examples of additives are as follows: Biocides such as KATHON™ LX biocide (Rohm & Haas, Philadelphia, Pa.) at <50 ppm and DOWICIL™ 75 biocide from Dow Chemical (Midland, Mich.) at 100–200 ppm; surface active agents such as SURFYNOL™ 465 surfactant (Air Products, Allentown, Pa.) at about 0.2% d/d and SURFYNOL™ 440 surfactant (Air Products) at about 0.2% d/d; defoamers such as FOAMASTER™ defoamer (Henkel) at <1% d/d, FOAMASTER™ KB defoamer (Henkel) at <1% d/d, DREWPLUS™ L474 defoamer (Drew Industrial, Division of Ashland Chemical Co.) <1% d/d, SURFYNOL™ 61 defoamer (Air Products) at about 0.9% by weight of aqueous, and SURFYNOL™ DF-75 defoamer (Air Products) at about 0.2% by weight of aqueous; and crosslinkers such as SUNREZ™ 700 crosslinker (Sequa) at 1–4% d/d, BACOTE™-20 crosslinker (Magnesium Elektron, Ltd.) at 2–10% d/d and GLYOXAL™ crosslinker (American Hoechst) at 5–15% d/d.

The PVOH coating may be applied to a surface of a building material, or it may be incorporated into the building material during the manufacture thereof. The building material to which the PVOH is applied may be uncured (has not yet hardened, e.g., a concrete surface which has not totally hardened) or it may be cured. Alternatively, the PVOH may be used as a component to form the building material, which is subsequently cast and cured. The PVOH coating may be applied to the building material over a wide range of temperatures, including sub-freezing temperatures (less than 32° F.) and high temperatures (greater than 100° F.).

The coating of PVOH may be cast or applied to a dry or wet surface by rolling, brushing, spraying, rolling, pouring, dipping and backrolling, etc. The coating may be applied by transfer pump at about two to three gallons/minute from a container to the surface of the building material, followed by rolling or brushing as with standard waterproofing paints. A densely filled, soft-fibered brush is preferably used to make sure that the PVOH solution evenly but liberally penetrates all surfaces of the building material.

The amount of PVOH desirably applied to the surface of a building material should be sufficient to achieve the desired control of suction, bonding, and moisture loss, i.e., an effective amount of PVOH should be applied to the building material surface. The precise amount will vary depending on the ambient temperature, and on the concentration and viscosity of the PVOH solution, as well as the nature, particularly the porosity, of the surface. A surface with high porosity, such as concrete block, will require more PVOH per surface square foot than will a less porous, less absorbent surface such as dense fired clay. As a rough rule of thumb, where the PVOH is applied as an aqueous solution having a concentration of about 0.001% to about 50% (percentages are by weight based on total weight of PVOH and water in the composition), the coverage rate will be about 1 to about 1,000 square feet of the surface per gallon of the coating, preferably about 10 to about 500 square feet/gallon, and more preferably about 40 to about 200 square feet/gallon. When using a solution having about 7% PVOH, about 40–200 square feet per gallon, preferably about 100–150 square feet/gallon of coating is applied to the surface, depending on the surface porosity.

After being coated with the PVOH solution, the surface of the building material should be allowed to dry, preferably for at least about 4 hours, in the absence of precipitation. When applied in extreme cold temperatures or under high humidity conditions, it will take longer for the PVOH coating to dry than is the case under high temperature, low humidity conditions. Drying time will also increase with increased coating thickness.

The surface of the building material is preferably clean before being coated with the PVOH solution of the invention. Methods to clean the surfaces of a building material are well known in the art. The surface may be slightly moistened prior to being coated with the PVOH solution, however is preferably dry to the touch when being coated with the PVOH solution. It is preferred to maximize the extent to which the PVOH solution penetrates the building material. Penetration may be assisted by lowering the viscosity of the solution. Viscosity may be lowered by reducing the molecular weight of the PVOH. Penetration may also be enhanced by the addition of a surface active agent to the PVOH solution. External variables can also enhance penetration. This includes temporarily (15 minutes or less) heating the building material to a temperature of up to about 300° F., or heating the building material for an extended period of time at a temperature not exceeding about 212° F. Alternatively, or in addition, the PVOH solution may be heated while it is being applied to the building material. Heating the PVOH solution reduces its viscosity, and this can increase penetration.

Furthermore, the present invention relates to a method for improving a building material, wherein a composition comprising polyvinyl alcohol (PVOH) is mixed with components needed to form the building material. The PVOH typically has a hydrolysis percent of at least about 70% and is mixed into the building material components at a concentration effective to achieve the desired control of suction, bonding, and moisture loss. According to this method, the PVOH is an integral component of the building material.

According to this embodiment of the invention, PVOH is preferably dissolved in solvent, and more preferably dissolved in water as described above, and the PVOH solution is added to the components that form the building material. For example, where the building material is cement, the PVOH solution can be added along with the water that is used to form the pre-cast concrete slurry. Another example would be the addition of cold water soluble grade PVOH to the dry ingredients of portland cement products followed by the addition of water in the cement hydration of these portland cement products that would result in building materials that would achieve the desired level of suction, bonding, and moisture loss. The PVOH should be present in the building material in an amount effective to achieve the desired level of suction, bonding, and moisture loss of the building material, and should have a hydrolysis percent of at least about 70%.

An effective amount of PVOH to achieve the desired control of suction, bonding, and moisture loss in a building material is generally about 0.001% to about 50% by weight based on the total weight of PVOH and building material. Preferably, about 0.01% to about 10%, and more preferably about 0.05% to about 5% of PVOH is incorporated into the building material.

Because PVOH rapidly decomposes above about 200° C., it should not be contacted with the building material at any point before which the building material will be exposed to 200° C. For example, the PVOH is preferably not incorporated into brick before the brick is fired. When PVOH is contacted with brick according to the invention, the PVOH is preferably applied to the brick after the brick has been cured and cooled. The PVOH solution can be added to the wet phase of cementitious materials, preferably as a replacement for some of the water that is used to form the wet phase cementitious material. Dry cold water soluble grade PVOH may be added to the wet phase of cementitious materials as well.

According to the afore-described methods, an article of manufacture is provided which contains building material subject to uncontrolled degrees of suction, bonding, and moisture loss and polyvinyl alcohol (PVOH). The article of manufacture may be a block or other form useful in building and constructing various structures, e.g., walls, roofs, fireplaces, etc. The article of manufacture may be building material coated with PVOH, or it may be building material wherein the PVOH is an integral component of the building material.

The following theory is offered to explain the efficacy of PVOH in achieving the desired control of suction, bonding, and moisture loss in building material. PVOH is comprised of long, straight chains of carbon, having hydroxyl groups appended thereto. The structure of PVOH may be abbreviated as (—CH2—CHOH—)n and thus it can be seen that hydroxyl groups are present on alternating carbon atoms of the straight carbon chain of PVOH. PVOH thus has a high density of hydroxyl groups. These hydroxyl groups have the ability to hydrogen bond to water, but they do not hydrogen bond to water as well as water hydrogen bonds to itself. For this reason, PVOH initially hydrogen bonds to water and causes at least a temporary retardation of moisture loss (phase one). Since water that has hydrogen bonded to PVOH is not as strongly bonded as if it were bonded to water, it evaporates more quickly than water that is hydrogen bonded to water (phase two). The presence of PVOH within building materials continually causes moisture within said building materials to be temporarily hydrogen bonded to the PVOH and then released which causes a reduced moisture content in that building material (phase three). Phase one results in a period of time where water is temporarily held which serves to optimize suction and bonding. Phase two results in accelerated water loss. Phase three results in an overall reduced moisture content.

The present invention helps to optimize suction such that moisture from water-based bonding agents (e.g., mortar) is not overly sucked into adjacent porous building material (e.g. brick). In this way, the present invention not only attracts moisture in the bonding agents to the surface of the porous building material, but also it prevents moisture from being overly attracted into the porous building material beyond the useful reach of the bonding agent. In this way optimal suction is achieved.

Porous building materials that are not treated with the present invention will have bond strengths that are subject to varying circumstances. Porous building materials that have a dense surface have diminished suction and bonding. Unusually porous building materials will have too much suction and diminished bonding. Weather and other conditions that accelerate evaporation cause less than optimal suction, and diminish bonding.

Porous building materials that are treated with the present invention experience an initial retardation of moisture loss, then an accelerated evaporation rate that corresponds favorably to the curing of Portland cement, and finally result in an overall water reduction. The initial retardation of moisture loss optimizes suction and increases bond strength. The second phase exemplified by accelerated evaporation and the final stage exemplified by lowered water content offset the deleterious effects of excess moisture and thereby improve the porous building materials.

Current art is severely restricted in the control of suction, bonding, and moisture content. Materials are not designed to control these aspects, but rather are subject to such factors as available materials, design choice, and weather conditions. One method of offsetting overly porous building materials and or high water loss conditions such as warm weather is to add excessive amounts of water to Portland cement based bonding materials. While this may somewhat offset overt suction, the resultant grout/bonding agent and consequent structure is weakened. During production of some porous building materials, evaporation is accelerated by means of kilns and other such dryers. Once these materials are removed from these apparati, they are subject to moisture gain and retention the same as if they had never been dried.

The following specific examples serve to further illustrate the invention. These examples are merely illustrative of the invention are not to be construed as a limitation thereof.

EXAMPLE 1

TREATMENT OF RED INCA BRICK (DENSE BRICK)

A 2% aqueous solution of PVOH was prepared for use on red inca brick. The PVOH was a 50%/50% blend by weight of AIRVOL™ 107 polyvinylalcohol and AIRVOL™ 321 polyvinylalcohol. The solution also contained 0.9% SURFYNOL™ 61 Surfactant from Air Products and Chemicals, Inc., Allentown, Pa. The bricks were immersed in the solution for about ten seconds and allowed to dry for a period of about a few days. These same bricks and another set of untreated bricks were formed into eight brick high prisms that were stack bonded with a conventional mortar mix. Four prisms were tested in all. One treated and one untreated prism were covered with a plastic bag, while one treated and one untreated prism were left uncovered and all were left outside during varying weather conditions that included rain. After approximately 28 days the prisms were tested under ASTM C1072 Masonry Flexural Bond Strength by an independent testing laboratory. The average tensile strength for the uncovered/untreated prism was 127.17 psi while the uncovered/treated prism was 163.0 psi. The average tensile strength for the covered/untreated prism was 158.0 psi, while the covered/treated prism was 219.8 psi. The results indicated considerably increased bond strength resulting from the treatment of the preferred embodiment.

EXAMPLE 2

TREATMENT OF CASCADE SPICE BRICK (POROUS BRICK)

An aqueous PVOH solution was prepared according to the procedure of Example 1, but applied to a porous brick type. The PVOH was a 50%/50% blend by weight of AIRVOL™ 107 polyvinylalcohol and AIRVOL™ 321 polyvinylalcohol. The solution also contained 0.9% SURFYNOL™ 61 Surfactant from Air Products and Chemicals, Inc., Allentown, Pa. The aqueous PVOH solution was applied to the porous brick by an approximate ten second immersion. After curing for about a few days the brick were formed into eight high prisms and stack bonded with a conventional mortar mix. Two such prisms were formed, one treated, one untreated, both were covered with a plastic bag. After about 28 days the prisms were tested by an independent lab in accordance with ASTM C1072 Masonry Flexural Bond Strength test. The result was that the average bond strength of the untreated prism was 32 psi, while the treated prism's bond strength was 143. In this test the treated prism exhibited bond strength more than 4.4 times that of the untreated prism.

EXAMPLE 3

TREATMENT OF DENSE CONCRETE PAVERS

The dry weights of two separate dense concrete pavers was determined.

A 7% aqueous solution of PVOH was prepared. The PVOH was a 50%/50% blend by weight of AIRVOL™ 107 polyvinylalcohol and AIRVOL™ 321 polyvinylalcohol. The solution also contained 0.9% SURFYNOL™ 61 Surfactant from Air Products and Chemicals, Inc., Allentown, Pa. A dense concrete pavers was treated on all but the bottom and about 1 inch of the sides with the 50/50 formula. After curing for about a few days the two pavers were weighed and then immersed in water for about 48 hours in order to become saturated with water. The rate of water (weight) loss was then observed and recorded. After 128 days, water loss of the pavers was considered to be stabilized. At that point the treated paver had lost over 41% more moisture than the untreated paver. In this example the treated paver exhibited accelerated moisture loss and an overall reduced moisture content over the untreated paver.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method for affecting the movement of moisture through a porous building material, comprising the step of applying an effective amount of a coating composition comprising polyvinyl alcohol (PVOH) onto a surface of a porous building unit, the amount being sufficient to affect the movement of moisture into the porous building material.

2. The method of claim 1 wherein the building unit comprises brick, cement, concrete, mortar, plaster or stucco.

3. The method of claim 1 wherein the surface of the building material is cured prior to being coated with the PVOH.

4. The method of claim 1 wherein the surface of the building material is uncured when coated with the PVOH.

5. The method of claim 1 wherein the PVOH has a hydrolysis percent of at least about 70%.

6. The method of claim 5 wherein the hydrolysis percent is about 87% to about 99.9%.

7. The method of claim 1 wherein the PVOH has a number average molecular weight of about 7,000 to about 500,000.

8. The method of claim 1 wherein the coating composition comprises PVOH dissolved in water.

9. The method of claim 8 wherein the PVOH will dissolve in water at about 1° C. to about 100° C.

10. The method of claim 9 wherein the PVOH requires a temperature of at least about 50° C. to dissolve in water.

11. The method of claim 9 wherein the PVOH dissolves in water at a temperature of about 80° C. to about 100° C.

12. The method of claim 8 wherein the weight of PVOH in the composition is about 0.001% to about 50% based on the total weight of the PVOH and water in the composition.

13. The method of claim 8 wherein the weight of PVOH in the composition is about 0.01% to about 30% based on the total weight of the PVOH and water in the composition.

14. The method of claim 1 wherein the coating composition is applied to the surface in an amount of about 1 to about 1000 square feet of surface/gallon of composition.

15. The method of claim 1 wherein the coating composition is applied to the surface in an amount of about 40 to about 200 square feet of surface/gallon of composition.

16. A porous building unit having a surface for adjoining to a bonding agent, said surface coated with a coating composition comprising polyvinyl alcohol (PVOH).

17. The porous building unit of claim 16, wherein the unit comprises concrete or cement.

18. The porous building unit of claim 17, said unit being in the shape of a block, a tile or a paver.

19. The porous building unit of claim 16, wherein the unit comprises clay.

20. The porous building unit of claim 16, wherein said PVOH having a hydrolysis percent of at least 70%.

21. The porous building unit of claim 18, wherein said PVOH having a hydrolysis percent of at least 70%.

22. The porous building unit of claim 16, wherein said coating composition further comprising a biocide.

23. The porous building unit of claim 16 wherein the surface has an amount of PVOH coating as results when an aqueous solution having a PVOH concentration of 7 wt % is applied to the surface in an amount of 40–200 square feet of surface per gallon of solution.

24. The porous building unit of claim 18 wherein the surface has an amount of PVOH coating as results when an aqueous solution having a PVOH concentration of 7 wt % is applied to the surface in an amount of 40–200 square feet of surface per gallon of solution.

* * * * *

UNITED STATES PATENT AND TRADEMARK OFFICE
CERTIFICATE OF CORRECTION

PATENT NO. : 6,110,270 B1
DATED : August 29, 2000
INVENTOR(S) : Thomas Beckenhauer Page 1 of 1

It is certified that error appears in the above-identified patent and that said Letters Patent is hereby corrected as shown below:

Claim 9, column 10,
Line 31, "about $1^0C$ $80^0C$. To " should read -- about $1^0C$ to --.

Claim 11, column 10,
Line 35, " about $80^0C$. To " should read -- about $80^0C$ to --.

Claim 15,
Line 45, "The method of claim 1" should read -- The method of claim 12 -- .

Signed and Sealed this

Twenty-eighth Day of September, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,110,270
DATED : August 29, 2000
INVENTOR(S) : Thomas Beckenhauer

Page 1 of 1

It is certified that error appears in the above-identified patent and that said Letters Patent is hereby corrected as shown below:

Claim 9, column 10,
Line 31, "about 1°C. to" should read -- about 1°C to --.

Claim 11, column 10,
Line 35, " about 80°C. to " should read -- about 80°C to --.

Claim 15, column 10,
Line 45, "The method of claim 1" should read -- The method of claim 12 --.

Signed and Sealed this

Fourth Day of September 2001

*Attest:*

Nicholas P. Godici

NICHOLAS P. GODICI
*Attesting Officer*   *Acting Director of the United States Patent and Trademark Office*